United States Patent
Yamamura et al.

(10) Patent No.: US 8,983,693 B2
(45) Date of Patent: Mar. 17, 2015

(54) GUIDANCE APPARATUS OF UNMANNED AUTONOMOUS OPERATING VEHICLE

(71) Applicant: Honda Motor Co., Ltd., Tokyo (JP)

(72) Inventors: Makoto Yamamura, Wako (JP); Toshiaki Kawakami, Wako (JP); Atsushi Moroi, Wako (JP); Kenta Kawanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 13/761,579

(22) Filed: Feb. 7, 2013

(65) Prior Publication Data

US 2013/0211645 A1 Aug. 15, 2013

(30) Foreign Application Priority Data

Feb. 10, 2012 (JP) .................. 2012-027633

(51) Int. Cl.
*G05D 1/02* (2006.01)

(52) U.S. Cl.
CPC ............ *G05D 1/0225* (2013.01); *G05D 1/0265* (2013.01); *G05D 2201/0208* (2013.01)
USPC .............................................. 701/22; 701/23

(58) Field of Classification Search
USPC .............. 701/22–26, 519, 302; 700/245, 253, 700/258; 320/109, 112, 113
See application file for complete search history.

(56) References Cited

U.S. PATENT DOCUMENTS

| 2,317,400 | A | 4/1943 | Paulus et al. |
| 8,433,468 | B2 * | 4/2013 | Johnson et al. .................. 701/23 |
| 2003/0094922 | A1 * | 5/2003 | Petersson et al. ............. 320/109 |

FOREIGN PATENT DOCUMENTS

| EP | 2413215 | 2/2012 |
| WO | 2005/074362 | 8/2005 |

OTHER PUBLICATIONS

Korean Office Action with English Translation dated Jan. 27, 2014, 7 pages.
European Search Report dated Jul. 25, 2013, Application No. 13154129.4, 7 pages.

* cited by examiner

*Primary Examiner* — Marthe Marc-Coleman
(74) *Attorney, Agent, or Firm* — Rankin, Hill & Clark LLP

(57) ABSTRACT

In an apparatus for guiding an unmanned autonomous operating vehicle having an electric motor supplied with power from a battery (30) for operating a lawn mower blades, other electric motors for driving wheels, and two magnetic sensors attached at the front for detecting intensity of a magnetic field of an area wire and controlled to run about in an operating area defined by the area wire to perform operation and to return to a charging device installed on the area wire so as to charge the battery, the area wire is laid with an offset to right or left when viewed in a plane such that the vehicle is turned from a straight-running position to a direction of the offset and then is returned to the straight-running position when the vehicle runs to be connected to the charging device, thereby guiding the vehicle to the charging device.

9 Claims, 5 Drawing Sheets

GUIDANCE APPARATUS OF UNMANNED AUTONOMOUS OPERATING VEHICLE

BACKGROUND

1. Technical Field

An embodiment of the invention relates to a guidance apparatus of an unmanned autonomous operating vehicle, particularly to an apparatus for guiding an operating vehicle that autonomously runs about in an operating area to perform an operation using a mounted operating machine, to a charging device.

2. Background Art

Conventionally, there are proposed a variety of autonomous operating vehicles that autonomously runs about in operating areas to perform operations using mounted operating machines (such as lawn-mowing blades), as taught, for example, by International Publication No. WO 2005/074362.

In the reference, a magnetic sensor attached to a front end of an operating vehicle detects the intensity of a magnetic field of an area wire laid along a border of an operating area to enable to recognize the operating area, and a mounted operating machine including lawn-mowing blades and installed with an electric motor is driven to perform the operation in the recognized operating area.

The motor of the vehicle in the technique stated in the reference is supplied with power from a mounted battery. In order to charge the battery, a charging device is disposed on the area wire and when the remaining battery level is decreased, the vehicle is controlled to return to the charging device along the area wire by the aid of the magnetic sensor.

SUMMARY

The vehicle disclosed in the reference is configured to be returned to the charging device disposed on the area wire to charge the battery when the remaining battery level is decreased as mentioned above. At that time, it is necessary to guide the vehicle to the charging device appropriately.

An object of an embodiment of the invention is therefore to overcome the foregoing drawback by providing a guidance apparatus of an unmanned autonomous operating vehicle having an electric motor supplied with power from a battery to drive an operating machine to perform an operation, which apparatus can guide the vehicle to a charging device when the vehicle is returned to the charging device to charge the battery.

In order to achieve the object, the embodiment of the invention provides an apparatus for guiding an unmanned autonomous operating vehicle having an electric motor supplied with power from a battery for operating an operating machine, prime movers for driving wheels, and magnetic sensors for detecting intensity of a magnetic field of an area wire, the vehicle being controlled to run about in an operating area defined by the area wire through wheels driven by the prime movers to perform an operation using the operating machine and to return to a charging device installed on the area wire so as to charge the battery, wherein the improvement comprises: the area wire is laid with an offset to right or left when viewed in a plane such that the vehicle is turned from a straight-running position to a direction of the offset and then is returned to the straight-running position when the vehicle runs to be connected to the charging device, thereby guiding the vehicle to the charging device.

BRIEF DESCRIPTION OF DRAWINGS

The above and other objects and advantages will be more apparent from the following description and drawings in which.

DESCRIPTION OF EMBODIMENT

A guidance apparatus of an unmanned autonomous operating vehicle according to an embodiment of the present invention will now be explained with reference to the attached drawings.

Figure 1:
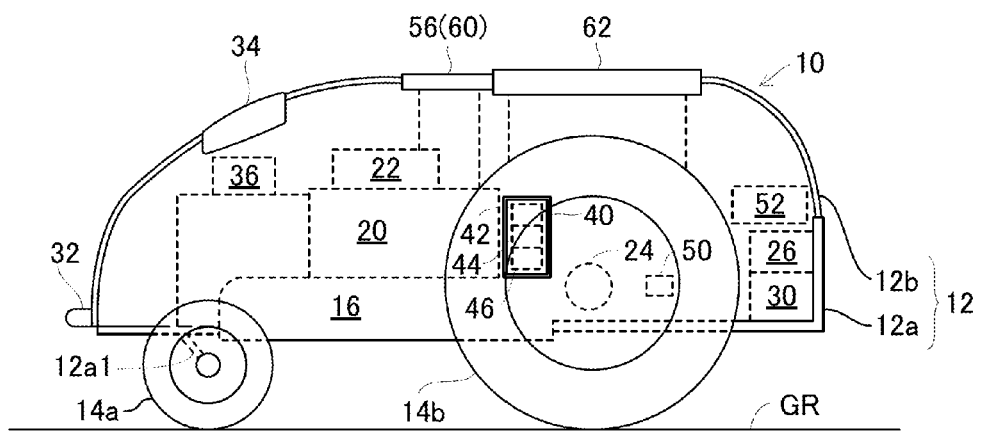
FIG. 1 is a side view of a guidance apparatus of an unmanned autonomous operating vehicle according to an embodiment of the invention.
Figure 2:
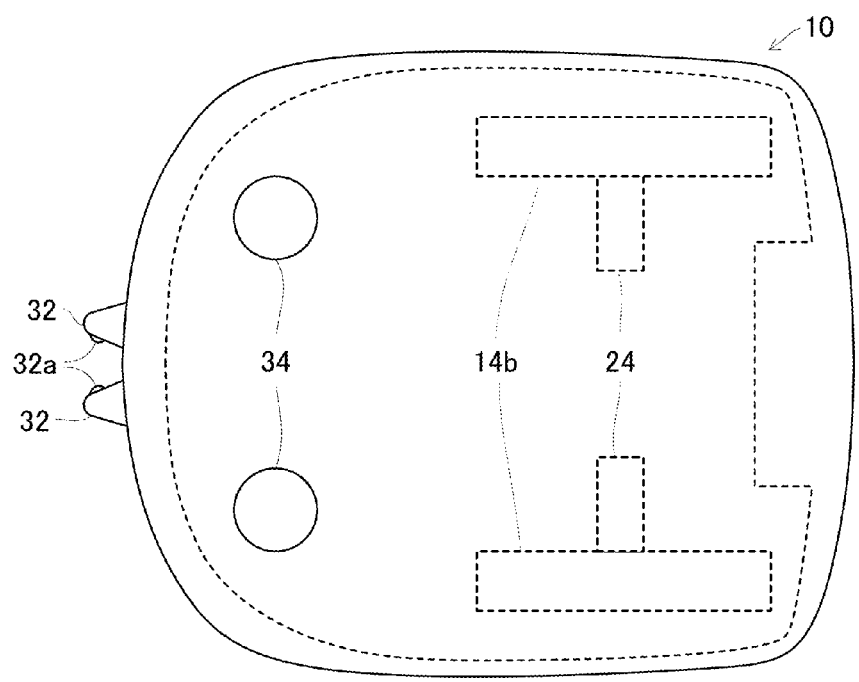
FIG. 2 is a plan view of the vehicle shown in FIG. 1.
Figure 3:
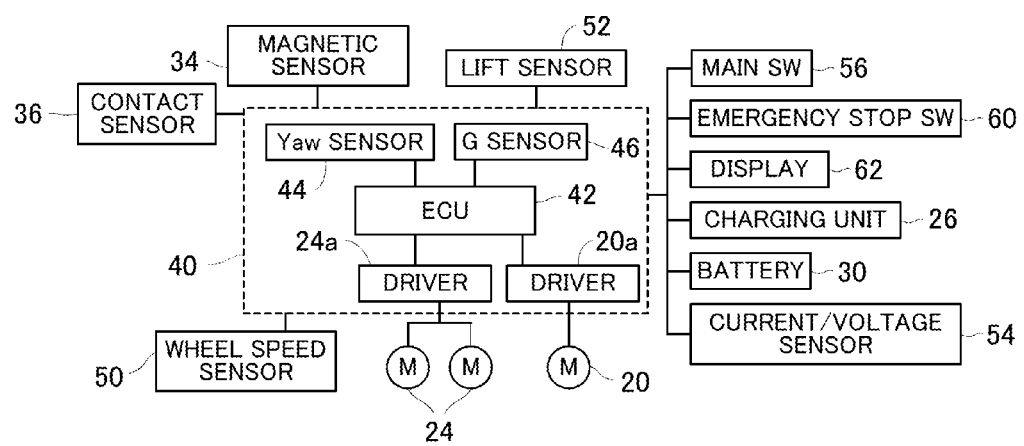
FIG. 3 is a block diagram showing input and output of devices mounted on the vehicle shown in FIG. 1.
Figure 4:
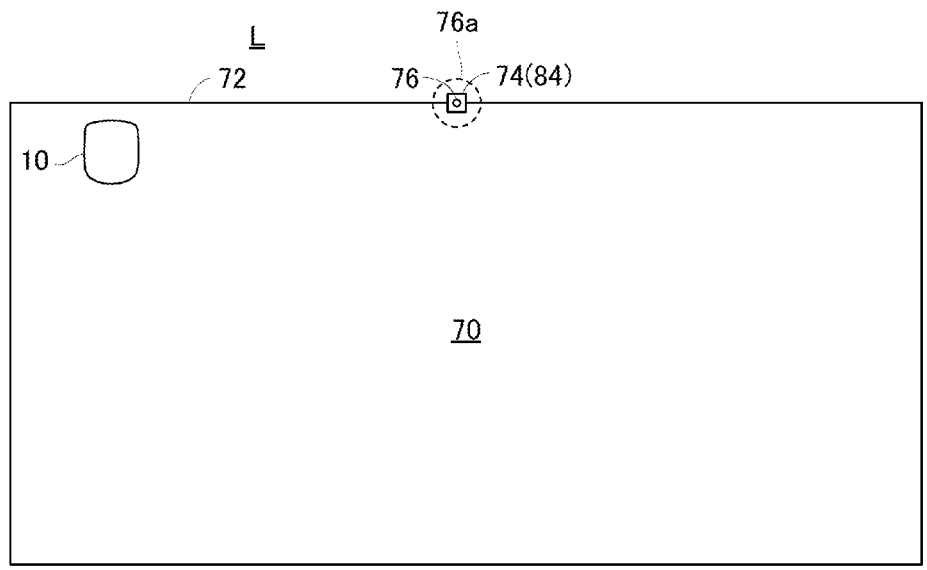
FIG. 4 is a plan view showing an operating area where the vehicle shown in FIG. 1 is to run about.

FIG. 1 is a side view of a guidance apparatus of an unmanned autonomous operating vehicle according to an embodiment of the invention, FIG. 2 is a plan view of the vehicle shown in FIG. 1, FIG. 3 is a block diagram showing input and output of devices mounted on the vehicle shown in FIG. 1 and FIG. 4 is a plan view showing an operating area where the vehicle shown in FIG. 1 is to run about.

As shown in FIGS. 1 and 2, symbol 10 indicates an unmanned autonomous operating vehicle. The vehicle 10 has a vehicle body 12 and wheels 14. The body 12 includes a chassis 12a and a frame 12b attached to the chassis 12a, while the wheels 14 include right and left front wheels 14a of a relatively small diameter that are fixed on the forepart of the chassis 12a through a stay 12a1, and right and left rear wheels 14b of a relatively large diameter that are directly attached to the chassis 12a.

Blades (rotary blades; operating machine) 16 for mowing lawn are attached in the center or thereabout of the chassis 12a, and an electric motor (hereinafter called the "operating motor") 20 is installed above the blades 16. The blades 16 are connected to the operating motor 20 to be driven and rotated thereby.

The blades 16 are also connected to a blade height adjustment mechanism 22 to be manually manipulated by an operator (user). The blade height adjustment mechanism 22 is equipped with a screw (not shown) to be manually turned by the operator for adjusting the height of the blades 16 from a contacting ground GR.

Two electric motors (prime movers; hereinafter called the "running motors") 24 are attached to the chassis 12a of the vehicle 10 to the rear of the blades 16. The running motors 24 are connected to the right and left rear wheels 14b to operate them so that the rear wheels 14b are rotated in the normal (forward running) direction or reverse (backward running) direction independently of each other to make the vehicle 10 to run about on the ground GR. In other words, the front wheels 14a serve as the free wheels while the rear wheels 14b serve as the driven wheels. The blades 16, operating motor 20, running motors 24, etc., are covered by the frame 12b.

A charging unit (including an AC/DC converter) 26 and battery 30 are accommodated at the rear of the vehicle 10 and two charging terminals 32 are attached at the front of the vehicle 10 on the frame 12b to protrude forward. Each of the terminals 32 has a contact point 32a on a side facing the other contact point 32a.

The terminals 32 are connected to the charging unit 26 through wiring and the charging unit 26 is connected to the battery 30 through wiring. The operating and running motors 20, 24 are connected to the battery 30 through wiring to be supplied with power therefrom. The wiring is not illustrated in FIGS. 1 and 2.

Thus, the vehicle 10 is constituted as a four-wheel, unmanned, electric autonomous operating vehicle (lawn-mowing vehicle) that is, for instance, about 600 millimeters long, 300 millimeters wide and 300 millimeters high.

A front end of the vehicle 10 is installed with two, i.e., right and left magnetic sensors (magnetism detector) 34. The frame 12b is attached with a contact sensor 36. When the frame 12b comes off from the chassis 12a upon having contact with an obstacle and such, the contact sensor 36 outputs an ON signal.

A housing box is provided in the center or thereabout of the vehicle 10 to house a board 40 on which an Electronic Control Unit (ECU; Controller) 42 including a microcomputer having a CPU, ROM, RAM, etc., is installed. The board 40 is also installed in the vicinity of the ECU 42 with a Yaw sensor (angular velocity sensor) 44 that produces an output or signal indicative of angular velocity (yaw rate) generated about a z-axis in the center of gravity of the vehicle 10 and with a G sensor (acceleration sensor) 46 that produces an output or signal indicative of an acceleration G acting on the vehicle 10 in the X, Y and Z (three-axis) directions.

A wheel speed sensor 50 is installed near the rear (driven) wheels 14b to produce an output or signal representing a wheel speed thereof. A lift sensor 52 is installed between the chassis 12a and frame 12b to output an ON signal when the frame 12b is lifted from the chassis 12a by the operator or the like.

A current/voltage sensor 54 is installed at the battery 30 to produce an output or signal indicative of SOC (State Of Charge) of the battery 30. The vehicle 10 is installed with a main switch 56 and emergency stop switch 60 to be manipulated by the operator.

The outputs of the foregoing magnetic sensors 34, contact sensor 36, Yaw sensor 44, G sensor 46, wheel speed sensor 50, lift sensor 52, current/voltage sensor 54, main switch 56 and emergency stop switch 60 are sent to the ECU 42.

The upper surface of the frame 12b of the vehicle 10 is widely cut away and a display 62 is installed therein. The display 62 is connected to the ECU 42 to show an operating mode, etc., in response to a command sent from the ECU 42.

Next, the explanation will be made on the operating area 70 where the vehicle 10 is to run or move about. The operating area 70 is defined by an area wire (electric wire) 72 that is embedded (laid) along a border of land L. A charge ST (station) 74 is provided on the area wire 72. Note that the vehicle 10 in FIG. 4 is exaggerated in size.

The charge ST 74 is disposed with an ST coil 76. A magnetic field radiated from the ST coil 76 forms a charging device detecting area 76a of a circle with center at the charge ST 74 with a radius of about one meter. Thus, the charge ST (charging device) 74 is disposed with the coil 76 radiating a magnetic field that forms a charging device detecting area around the charge ST 74.

Figure 5:
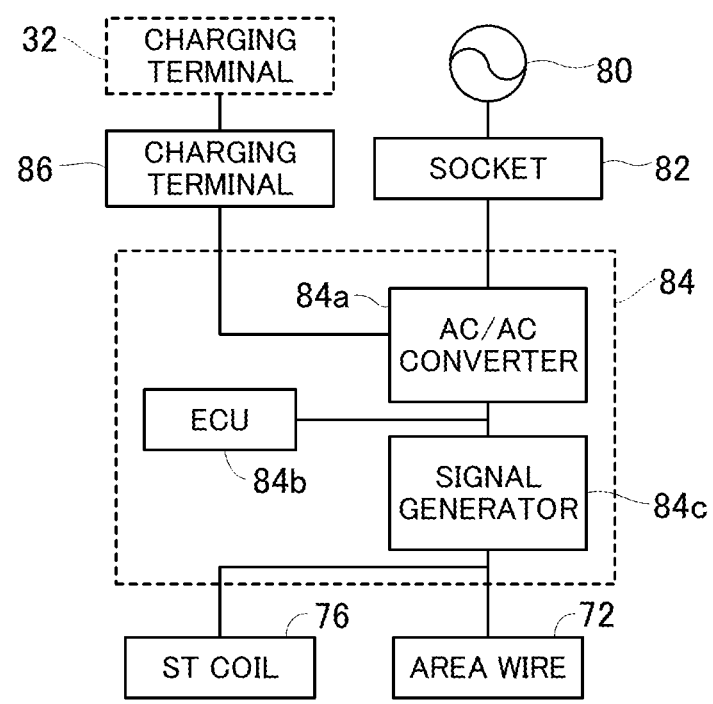
FIG. 5 is a block diagram showing the configuration of the charge ST (station) shown in FIG. 4.
Figure 6:
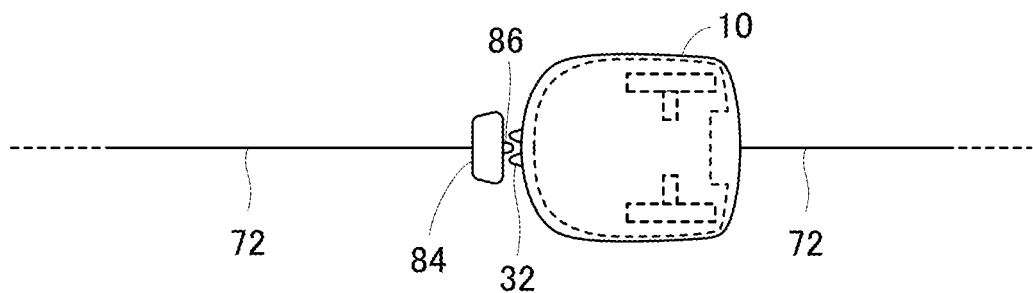
FIG. 6 is an explanatory view showing a charging process at the charge ST shown in FIG. 5.

As shown in FIG. 5, the charge ST 74 has a charging device 84 connected to a commercial power source 80 through a socket 82, and a charging terminal 86 that is connected to the charging device 84 and connectable to the contact points 32a of the charging terminals 32 of the vehicle 10 through its contact points. The charging terminal 86 is shown in FIG. 6 (the contact points thereof are not illustrated).

The charging device 84 has an AC/AC converter 84a, an Electronic Control Unit (ECU) 84b that includes a microcomputer similarly to the ECU 42 and controls the operation of the AC/AC converter 84a, and a signal generator 84c that supplies alternating current to the area wire 72 and ST coil 76 to generate signals.

Alternating current coming from the commercial power source 80 through the socket 82 is appropriately stepped down by the AC/AC converter 84a of the charging device 84 and, when the vehicle 10 is returned and connected to the charge ST 74 through the charging terminals 32 and 86, the current is sent to the vehicle 10 to charge the battery 30 through the charging unit 26.

The operation of detecting the operating area 70 will be explained. Upon power supply from the signal generator 84c, a magnetic field is generated around the area wire 72. The intensity of the magnetic field varies depending on the entire length of the area wire 72 and also varies depending on a distance d from the area wire 72 as shown in FIG. 7.

The intensity of the magnetic field of the area wire 72 is detected by the magnetic sensors 34 attached to the vehicle 10 and sent to the ECU 42. Based on the detected values, the ECU 42 detects a position of the subject vehicle (unmanned autonomous operating vehicle 10) with respect to the area wire 72 (i.e., whether the subject vehicle is positioned inside or outside the operating area 70) and the distance of the subject vehicle from the area wire 72 (the border of the operating area 70).

Figure 7:
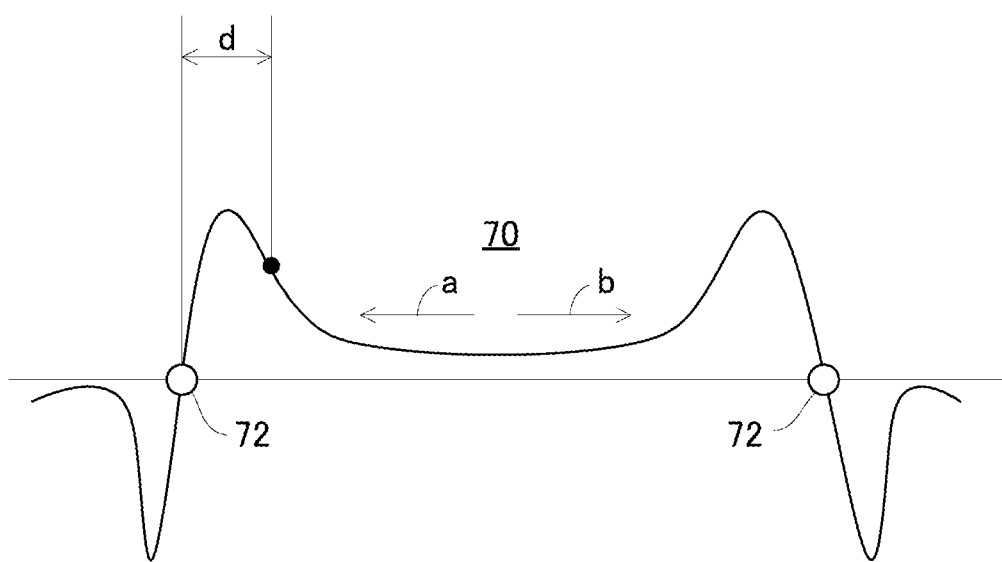
FIG. 7 is an explanatory view showing a magnetic field of an area wire embedded in the operating area shown in FIG. 4.

More specifically, as shown in FIG. 7, when the subject vehicle is moved from the inside of the operating area 70 to the outside thereof in a direction indicated by an arrow a, as the distance from the area wire 72 is reduced (as the subject vehicle is moved closer to the area wire 72), the intensity of the magnetic field is gradually increased on a positive side and afterward, decreased. When the subject vehicle is positioned on the area wire 72, the intensity becomes zero. Subsequently, when the distance from the area wire 72 is again increased, the intensity exhibits the similar characteristics on a negative side. Also when the subject vehicle is moved from the inside of the operating area 70 to the outside thereof in a direction indicated by an arrow b, the characteristics similar to the above pattern are exhibited.

The operation of the vehicle 10 will be explained. The height of the blades 16 is manually adjusted by the operator through the blade height adjustment mechanism 22 in accordance with a growing condition of the lawn in the operating area 70. When the main switch 56 is switched on so that the ON signal is outputted, the ECU 42 starts to be operated and enters an operating mode to mow the lawn.

In the operating mode, the ECU 42 calculates a power supply control value with which a vehicle speed detected from the output of the wheel speed sensor 50 becomes a predetermined value and supplies the calculated value to the running motors 24 through a driver 24a to make the vehicle 10 run or move about. Further, the ECU 42 calculates a power supply control value with which rotational speeds of the blades 16 become a predetermined value and supplies the calculated value to the operating motor 20 through a driver 20a to operate the blades 16 to perform the operation.

To be more specific, in the operating mode, the ECU 42 makes the vehicle 10 run randomly (or in accordance with an operation pattern) to perform the operation within the operating area 70. When determining that the vehicle 10 has moved out of the operating area 70 based on the outputs of the magnetic sensors 34, the ECU 42 changes a running direction detected based on the output of the Yaw sensor 44 by a predetermined angle so that the vehicle 10 comes back to the inside of the operating area 70.

Since the right and left rear (driven) wheels 14b are configured so that they are driven by the running motors 24 to rotate in the normal and reverse directions independently or separately from each other, when the motors 24 are rotated in the normal direction at the same speed, the vehicle 10 runs straight, whilst when they are rotated in the normal direction at different speeds, the vehicle 10 is turned toward a side of lower rotational speed. When one of the motors 24 is rotated in the normal direction and the other is rotated in the reverse direction, since the rear wheels 14b are rotated in the same direction as the associated motor's rotation, the vehicle 10 is turned at the same position (which is so-called pivot turn).

Thus, in the operating mode, the ECU 42 makes the vehicle 10 run about within the operating area 70 while changing the running direction thereof randomly whenever the vehicle 10 reaches the area wire 72, and drives the blades 16 to perform the operation.

Further, in the operating mode, the ECU 42 monitors the SOC of the battery 30 based on the output of the current/voltage sensor 54 and when the remaining battery level is decreased to a predetermined level, transitions to a return mode in which the vehicle 10 is returned to the charge ST 74 to charge the battery 30 by the charging device 84.

In the operating mode and return mode, when any of the contact sensor 36, lift sensor 52 and emergency stop switch 60 produces the ON signal, the ECU 42 stops the operating and running motors 20, 24 to stop the operation and running of the vehicle 10.

In the return mode, based on the outputs of the magnetic sensors 34, the ECU 42 controls amounts of power to be supplied to the running motors 24 using a feedback control law such as a proportional term so that a front portion of the vehicle 10 is slightly shaken right and left to be positioned inside and outside the operating area 70 alternately, thereby controlling the vehicle 10 to run on or along the area wire 72.

Figure 8:
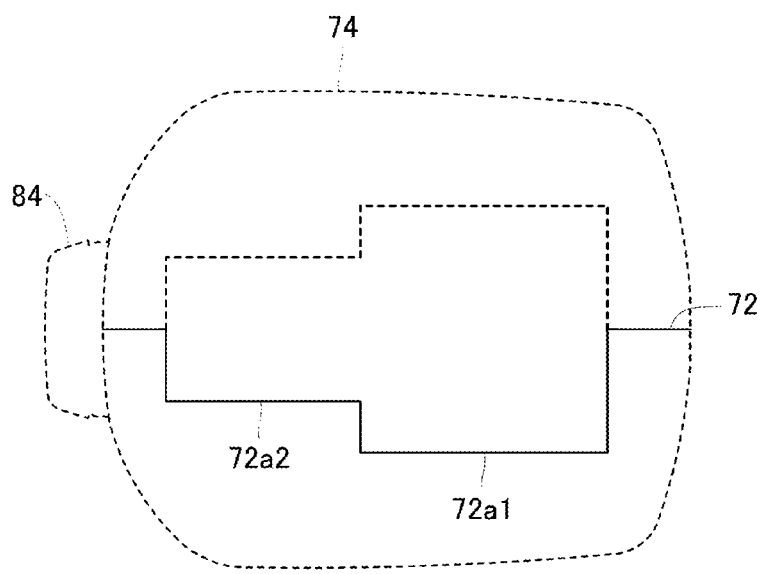
FIG. 8 is a plan view of the area wire for showing the configuration of the apparatus shown in FIG. 1.

FIG. 8 is a plan view for showing the installment of the area wire, i.e., for explaining the configuration of the apparatus according to this embodiment.

As shown in FIG. 8, in this embodiment, the area wire 72 is laid with an offset to the right or left, i.e., to the left in the illustrated example, when viewed in a plane. Specifically, the area wire 72 is provided with a first offset portion 72a1 that is greatly offset to the right or left (to the left), and with a second offset portion 72a2 that is continued from the first offset portion 72a1 and is offset by an amount smaller than the first offset portion 72a1.

Figure 9:
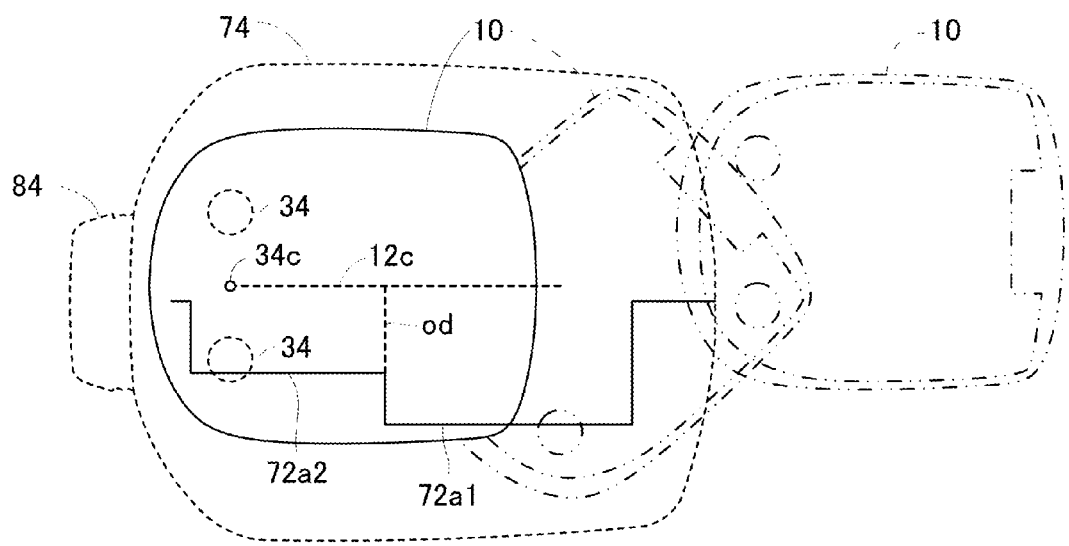
FIG. 9 is an explanatory view of the area wire for showing the configuration related to an operation of the apparatus shown in FIG. 1.

To be more specific, as shown in FIG. 9, the first and second offset portions 72a1, 72a2 are offset from a line 12c that connects a mid point 34c between the right and left magnetic sensors 34 installed on both sides of the vehicle body 12 and a longitudinal center line of the vehicle body 12. The first offset portion 72a1 is offset from the line 12c by a predetermined distance do1 and the second offset portion 72a2 is offset from the line 12c by a predetermined distance do2.

The predetermined distance do1 is a value equal to or greater than a distance (substantially equal to the predetermined distance do2) from the line 12c connecting the mid point 34c and the longitudinal center line to one of the magnetic sensors 34 on a side of the offset (on the left side in the drawing).

Owing to this configuration, as shown in FIG. 9, when the vehicle 10 runs on the area wire 72 to be connected to the charging device 84 of the charge ST 74, the vehicle 10 is controlled to greatly turn from the straight-running position to the offset direction (to the left) and then, returns to the straight-running position, whereby the vehicle 10 can be appropriately guided to the charging device 84 of the charge ST 74.

Specifically, when returning to the charging device 84, the vehicle 10 runs along the area wire 72 while slightly shaking the front portion (head) so that the front portion is positioned inside and outside the operating area 70 alternately. Since the area wire 72 is arranged as explained above, when the vehicle 10 has come close to the charging device 84, the vehicle 10 is controlled to turn from the straight-running position to the offset direction and accordingly, it brings an axle of the rear (driven) wheels 14b closer to the center or thereabout of the charging device 84.

Since, subsequently, the area wire 72 guides the vehicle 10 back to the straight-running position through the second offset portion 72a2, the vehicle 10 can be appropriately guided to the charging device 84 of the charge ST 74, thereby accurately connecting the charging terminals 32, 86 with each other.

As indicated by dashed lines in FIG. 8, the area wire 72 can be laid with an offset to the right. Further, although the vehicle 10 in the embodiment is of a rear-wheel-drive type, it may be of a front-wheel-drive type.

As stated above, the embodiment is configured to have an apparatus for guiding an unmanned autonomous operating vehicle (10) having an electric motor (20) supplied with power from a battery (30) for operating an operating machine (blades 16), prime movers (electric motors 24) for driving wheels (14), and magnetic sensors (34) for detecting intensity of a magnetic field of an area wire (72), the vehicle being controlled to run about in an operating area (70) defined by the area wire through wheels driven by the prime movers to perform an operation using the operating machine and to return to a charging device (84) installed on the area wire so as to charge the battery, characterized in that: the area wire (72) is laid with an offset to right or left when viewed in a plane such that the vehicle (10) is turned from a straight-running position to a direction of the offset and then is returned to the straight-running position when the vehicle runs to be connected to the charging device (84), thereby guiding the vehicle to the charging device. With this, it becomes possible to appropriately guide the vehicle 10 to the charging device 84.

Specifically, when returning to the charging device 84, based on the outputs of the magnetic sensors 34, the vehicle 10 runs along the area wire 72 while slightly swing the front portion thereof so that the front portion is directed and positioned inside and outside the operating area 70 alternately. Since the area wire 72 is arranged as explained above, when the vehicle 10 has come close to the charging device 84, the vehicle 10 is controlled to turn from the straight-running position to the offset direction and accordingly, it brings the axle on the driven side (the axle of the rear wheels 14b) closer to the center or thereabout of the charging device 84. Since, subsequently, the vehicle 10 is guided back to the straight-running position, it becomes possible to appropriately guide the vehicle 10 to the charging device 84, thereby accurately connecting the charging terminals 32, 86 with each other.

In the apparatus, the magnetic sensors (34) comprise a right magnetic sensor and a left magnetic sensor installed on both sides of a vehicle body (12), and the area wire (72) is made offset from a line (12c) connecting a mid point (34c) between the right and left magnetic sensors with a longitudinal center line of the vehicle body by a predetermined distance (do1). With this, it becomes possible to adequately turn the vehicle 10 to the offset direction to bring the axle on the driven side (the axle of the rear wheels 14b) closer to the center or thereabout of the charging device 84.

In the apparatus, the predetermined distance (do1) is a value equal to or greater than a distance (do2) from the line (12c) connecting the mid point and the longitudinal center line to one of the magnetic sensors on a side of the offset. With this, it becomes possible to further adequately turn the vehicle 10 to the offset direction to bring the axle on the driven side (the axle of the rear wheels 14b) closer to the center or thereabout of the charging device 84.

In the apparatus, the wheels (14) include front wheels (14a) and rear wheels (14b) and the vehicle (10) is a rear-wheel-drive type vehicle in which the rear wheels are driven. With this, when the vehicle 10 is turned to the offset direction, the axle of the rear wheels 14b can be brought closer to the center or thereabout of the charging device 84. In addition, since the front wheels 14a are the free wheels, it becomes possible to reliably guide the vehicle 10 back to the straight-running position.

In the apparatus, the vehicle (10) has a charging terminal (32) at its front to be connectable with the charging device (84) installed on the area wire (72), and the operating machine (16) comprises a lawn mower for mowing lawn on a ground GR.

In the apparatus, the charging device is disposed with a coil (ST coil) 76 radiating a magnetic field that forms a charging device detecting area around the charging device. With this, it becomes possible to detect the charging device more easily.

It should be noted that, in the foregoing, although the electric motor is applied as the prime movers 24, it may be an internal combustion engine or a hybrid of an engine and electric motor.

It should also be noted that, although the lawn-mowing blades are exemplified as the operating machine, but it should not be limited thereto.

Japanese Patent Application No. 2012-027633, filed on Feb. 10, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for guiding an unmanned autonomous operating vehicle having an electric motor supplied with power from a battery for operating an operating machine, prime movers for driving wheels, and magnetic sensors for detecting intensity of a magnetic field of an area wire, the vehicle being controlled to run about in an operating area defined by the area wire through wheels driven by the prime movers to perform an operation using the operating machine and to return to a charging device installed on the area wire so as to charge the battery, wherein the apparatus comprises a controller configured to control the vehicle in an operating mode and in a return mode, wherein in the operating mode, the controller controls the vehicle to run about in the operating area to perform the operation using the operating machine, and in the return mode, the controller controls the vehicle to run on the area wire so as to return the vehicle to the charging device, and at a position near the charging device, the area wire is laid with an offset to right or left when viewed in a plane such that, as the controller controls the vehicle in the return mode to run on the area wire and the offset of the area wire to the charging device for connection with the charging device, the vehicle is turned from a straight-running position to a direction of the offset and then is returned to the straight-running position, thereby guiding the vehicle to the charging device.

2. The apparatus according to claim 1, wherein the magnetic sensors comprise a right magnetic sensor and a left magnetic sensor installed on both sides of a vehicle body, and the area wire is made offset from a line connecting a mid point between the right and left magnetic sensors with a longitudinal center line of the vehicle body by a predetermined distance.

3. The apparatus according to claim 2, wherein the predetermined distance is a value equal to or greater than a distance from the line connecting the mid point and the longitudinal center line to one of the magnetic sensors on a side of the offset.

4. The apparatus according to claim 1, wherein the wheels include front wheels and rear wheels and the vehicle is a rear-wheel-drive type vehicle in which the rear wheels are driven.

5. The apparatus according to claim 1, wherein the vehicle has a charging terminal at its front to be connectable with the charging device installed on the area wire.

6. The apparatus according to claim 1, wherein the operating machine comprises a lawn mower for mowing lawn on a ground.

7. The apparatus according to claim 1, wherein the charging device is disposed with a coil radiating a magnetic field that forms a charging device detecting area around the charging device.

8. The apparatus according to claim 1, wherein the controller is configured to control the vehicle, in the return mode, to run on the area wire while slightly swinging a front portion of the vehicle so that the front portion of the vehicle is directed and positioned alternately inside and outside of the operating area.

9. The apparatus according to claim 1, wherein the offset includes a first offset portion and a second offset portion that are continuous with each other, and the second offset portion is offset by an amount smaller than that of the first offset portion.

* * * * *